United States Patent

[11] 3,580,060

[72] Inventor Joseph E. Huskey
 Copperhill, Tenn.
[21] Appl. No. 770,150
[22] Filed Oct. 24, 1968
[45] Patented May 25, 1971
[73] Assignee Cities Service Company

[54] HARDNESS TESTER
4 Claims, 1 Drawing Fig.
[52] U.S. Cl. ..................................................... 73/78,
73/94
[51] Int. Cl. ........................................ G01n 3/18,
G01n 3/08
[50] Field of Search........................................... 73/78, 90,
91, 93, 95, 94, 97, 102; 177/68; 137/403, 408

[56] References Cited
UNITED STATES PATENTS

| | | | |
|---|---|---|---|
| 771,125 | 9/1904 | Cash.............................. | 73/95 |
| 1,887,850 | 12/1932 | Bonney et al.................. | 73/94 |
| 2,054,304 | 9/1936 | Steinbach....................... | 73/94 |
| 2,259,491 | 10/1941 | Roller............................. | 73/94 |
| 2,416,012 | 2/1947 | Lee et al........................ | 73/95 |
| 3,309,474 | 3/1967 | Heinrich......................... | 137/408 |
| 2,338,825 | 1/1944 | Stoner............................ | 73/438 |

Primary Examiner—Richard C. Queisser
Assistant Examiner—Ellis J. Koch
Attorney—J. Richard Geaman ABSTRACT: The hardness of crushable materials is determined by an apparatus capable of applying a uniformly increasing compression force to the material undergoing test. This force is applied by a plunger exerting a downward pressure on the crushable material and by the weight of a receiving container suspended from the plunger. During the test, the weight exerted by the suspended container is continuously and uniformly increased by the flow of fluid from a reservoir tank into the receiving container. The flow of fluid is commenced by the opening of a normally closed solenoid valve in response to the closing of a relay switch. This switch is adapted to assume an open position when the weight of fluid in the receiving container becomes sufficient to cause the plunger to drop to a lower position upon crushing of the crushable material being tested. The opening of the relay switch, in turn, causes the solenoid valve to close upon crushing of the material being tested. The weight of the plunger and the suspended receiving container, together with the fluid in the container, provides a precise measure of the hardness of the crushable material.

PATENTED MAY 25 1971 3,580,060
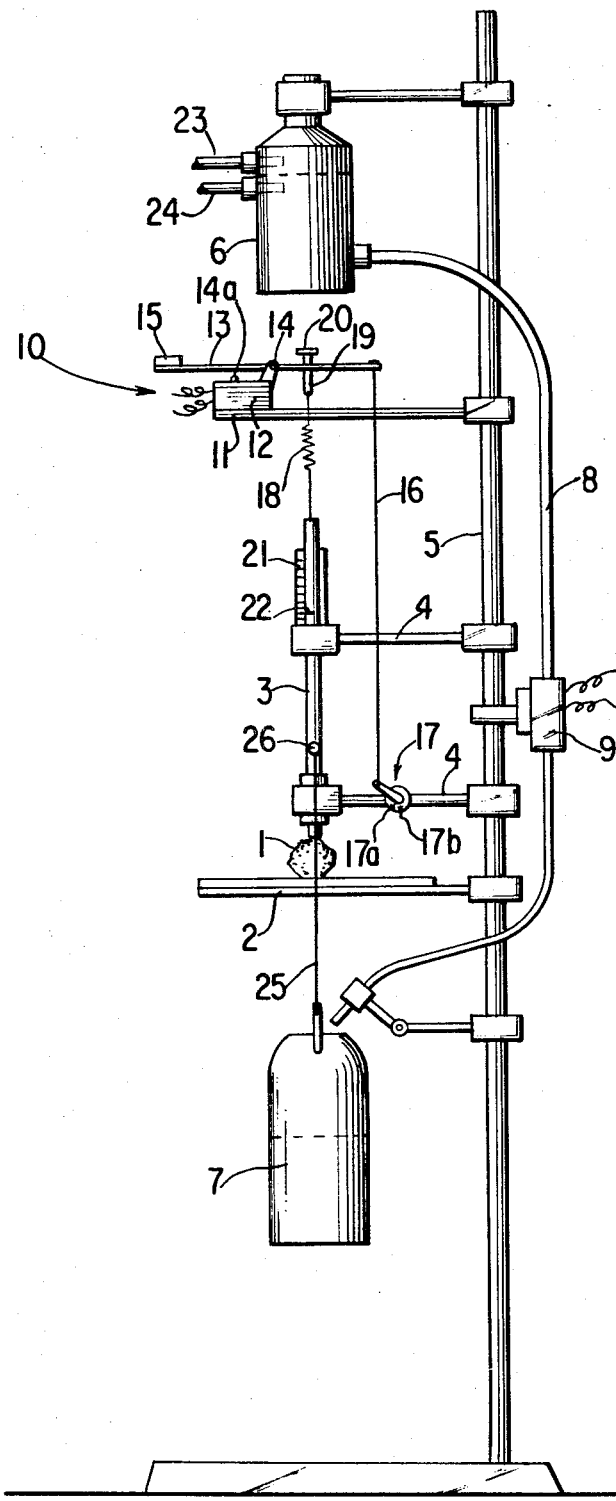
INVENTOR
JOSEPH E. HUSKEY
BY
ATTORNEY 3,580,060

HARDNESS TESTER

BACKGROUND OF THE INVENTION

1. Field of the Invention

This invention relates to the determination of the hardness of crushable materials. More particularly, it relates to an apparatus for precisely measuring the hardness of such materials.

2. Description of the Prior Art

In the metallurgical and chemical processing industries, crushable materials are often produced or treated in various forms such as pellets. The hardness or compression strength of such materials is frequently an important factor in the control of such operations. Various types of testing equipment have been proposed, therefore, for measuring the hardness or compression strength of pellets and other forms of crushable material.

The testing equipment heretofore available, however, has not been entirely satisfactory from an economic viewpoint. For example, equipment employing a motor-driven hydraulic press for compressing a pellet is necessarily expensive. The cost of other devices for precisely measuring pellet hardness, such as those employing a screw-type mechanism for applying pressure to the pellet being tested, is also relatively high.

Since simple and inexpensive equipment for the precise measurement of the compression strength of crushable materials has heretofore been unavailable, various alternatives have been employed for determining the relative strength of crushable materials. A common expedient has been to drop a number of pellets from a particular operating batch from a given height and to observe the number of such pellets that are broken upon impact. For example, 100 pellets from one batch may be dropped from a 6-foot height with a breakage of 70 pellets. If out of 100 pellets from a second batch a total of 60 pellets were broken, the compression strength of the pellets in the second batch would be deemed greater than that of the pellets in the first batch. The percentage of breakage, therefore, is taken as a measure of the relative hardness of the crushable material being tested. While such techniques are a useful means for quickly obtaining information concerning the relative strength of crushable materials, they do not provide a precise measurement of the compression strength of such materials. In addition, these techniques often depend upon the particular skill and experience of the particular individual performing the test.

It is an object of this invention, therefore, to provide an improved means for measuring the compression strength of crushable materials.

It is another object of the invention to provide an apparatus for precisely measuring the compression strength of crushable materials.

It is a further object of this invention to provide a simple and inexpensive apparatus for measuring the compression strength of crushable materials.

With these and other objects in mind, the present invention is hereafter disclosed in detail, the novel features thereof being pointed out in the appended claims.

SUMMARY OF THE INVENTION

The objects of the invention are accomplished by an apparatus that serves to apply a continually increasing downward force to the crushable material being tested. This force is exerted by a plunger positioned above and in contact with the material being tested. Suspended from the plunger is a receiving container into which a measuring fluid is caused to flow during the test. The increasing weight of the fluid accumulating in the receiving container, therefore, cause the force exerted by the plunger to increase during the test. When this force exceeds the hardness or compression strength of the crushable material, the test material will, of course, fail or break apart.

Upon crushing of the test material in this manner, the plunger will drop to a lower position. This downward movement of the plunger is adapted to open a relay switch, thereby deactivating a normally closed solenoid valve that controls the flow of the measuring fluid to the receiving container. The flow of measuring fluid into the container is thus terminated upon crushing of the material being tested. The weight of the fluid in the receiving container, together with the tare of the plunger and its suspended receiving container, constitutes a precise measure of the hardness or breaking strength of the material being tested.

BRIEF DESCRIPTION OF THE DRAWING

The invention is hereinafter further described with reference to the accompanying drawing representing a side elevational view of a particular embodiment thereof.

DETAILED DESCRIPTION OF THE INVENTION

The apparatus of the present invention may be employed with respect to any crushable material present in any convenient form. In the illustrated embodiment, the crushable material is in the form of pellet 1 positioned between plunger 3 and supporting stand 2. Plunger 3 is slidably positioned for vertical movement by supporting clamps 4 secured to table stand 5.

Reservoir tank 6 is positioned above receiving container 7 so that measuring fluid may flow by gravity flow from the reservoir tank through line 8 to the receiving container during the test. The flow of measuring fluid in line 8 is controlled by normally closed solenoid valve 9 positioned therein.

Solenoid valve 9 is controlled by switching means generally represented by the numeral 10. The switching means include normally open microswitch 12 positioned on support 11. A conventional circuit, not fully shown for convenience of drawing, connects microswitch 12 with solenoid valve 9. Microswitch 12 is activated by the action of pivotable contact member 13 that is pivoted at pivot point 14. A weight 15 is positioned at one end of contact member 13 so as to urge said member to assume a microswitch-activating position by contact with contact point 14a.

At its opposite end, contact member 13 is connected to downwardly extending line 16, which in turn is secured to operating switch 17. This switch is adapted for movement between two positions, an operative position 17a and an inoperative position 17b. When operating switch 17 is in its operative position 17a, line 16 is not capable of applying sufficient force to pivotable contact member 13 to prevent its assuming its normally closed position due to the effect of weight 15 positioned at the opposite end thereof. Wheel operating switch 17 in its inoperative position, however, line 16 is drawn downward so as to exert sufficient force on said pivotable contact member 13 to hold said member in an open position.

At its upper end, plunger 3 is connected to spring 18 which, in turn, is connected on its upper end to rod 19 that extends upwardly through an opening, not shown, in pivotable contact member 13. Rod 19 has a flange 20 at is uppermost end so that a downward movement of rod 19 in response to the downward movement of plunger 3 will cause pivotable contact member 13 to pivot to an open position. Spring 18 serves to absorb some of the downward movement of plunger 3 so that the amount of movement of pivotable contact member 13 and the strain generally imposed upon the switching means may be minimized.

In addition to its hardness, it is also desirable to measure the diameter or width of the material being tested. This may conveniently be accomplished by means of the millimeter scale 21 positioned about the slidably mounted plunger 3. By calibrating this scale with bench mark 22 on the plunger itself, the diameter of pellet 1 can readily be determined when the pellet is positioned in readiness for test.

In order to minimize variations in the rate of flow of measuring fluid from reservoir tank 6 to receiving container 7, water inlet 23 and water overflow 24 are provided in order to maintain a constant head of water in reservoir tank 6 during the test.

Receiving container 7 is positioned under and is suspended from plunger 3 by means of supporting lines, only one of which is shown in the drawing. While the container could be suspended by a single line, it is preferable to provide at least two suspending lines 25 attached at diametrically opposed positions 26 on plunger 3 and on receiving container 7. In this manner, the force exerted by the plunger on the crushable material being tested may be applied more uniformly than if receiving container 7 were suspended from only one side of the plunger.

In operation, pellet 1 is positioned on supporting stand 2 with plunger 3 positioned above and in contact with the pellet. Switch 17 is in its inoperative position 17b so that pivotable contact member 13 is held in its open position. Water is flowed into reservoir tank 6 through inlet 23, with the overflow pressing through outlet 24. The diameter of the pellet may be read on measuring scale 21 by means of bench mark 22 on plunger 3.

Switch 17 is turned to operative position 17a in which line 16 is not able to hold pivotable contact member 13 in an open position. Contact member 13 thereupon assumes an operative position in contact with contact point 14a. Normally open microswitch 12 is thus closed sending an energizing signal for activation of normally closed solenoid valve 9, which upon opening permits the flow of measuring fluid from reservoir tank 6 to receiving container 7. As the measuring fluid continually accumulates in receiving container 7, the total force applied to pellet 1 by plunger 3 increases continually and uniformly. The force is equal to the weight of the plunger itself and the weight of receiving container 7, together with the weight of the accumulated measuring fluid in container 7 and the tare of the supporting members, such as lines 25, spring 18 and rod 19.

When the total force exerted by plunger 3 exceeds the hardness or compression strength of pellet 1, the pellet will be crushed. When the pellet fails in this manner, plunger 3 will move abruptly downward so that flange 20 of rod 19 contacts pivotable contact member 13 and causes it to pivot to an open position. Excessive movement is prevented by spring 18 that absorbs part of the downward movement of plunger 3.

When pivotable contact member 13 is moved to an open position upon failure of pellet 1, microswitch 12 is opened and the activating signal to solenoid valve 9 is broken. The solenoid valve is thus deactivated and assumes its normally closed position stopping the flow of measuring fluid from reservoir tank 6 to receiving container 7. The weight of the measuring fluid that has accumulated in receiving container 7 during the test, therefore, is a measure of the hardness of the pellet being tested.

By means of the relatively simple apparatus of the present invention, an accurate, numerical comparison of the hardness of pellets or other crushable material from one batch or operation may readily be compared with those of another operation or batch. The apparatus may be adapted, as would be obvious to those skilled in the art, for the measuring of the hardness of crushable materials within any convenient range of hardness. The apparatus is particularly convenient for testing the hardness of raw pellets, such as raw iron oxide pellets. A hardness range of from about 120 to about 3,900 grams, i.e. approximately ¼ to 8½ pounds, has been found convenient, although testers accommodating hardness values outside this range may also be accommodated.

In order to accommodate materials of varying hardness, the size of the receiving container 7 may be varied, with a larger container being employed when a harder pellet requiring the accumulation of more measuring fluid is required. It is also within the scope of this invention to employ various measuring fluids so that the weight added per unit volume of fluid in the receiving container may be varied. While water is the most convenient measuring fluid, therefore, heavier liquids may also be employed. Free-flowing solids may also be employed as the measuring fluid although liquids are generally preferable.

The receiving container may be calibrated with respect to the particular measuring fluid employed so as to permit a rapid determination of the force required to break the pellet from an observation of the volume of fluid in the receiving container. It would also be possible to employ a strain gauge or some similar device to measure the applied pressure, together with a recorder to record the results. The pellets may also be crushed in weighed dishes to permit convenient moisture and similar determinations.

Various other modifications may also be employed within the scope of the present invention. For example, the breaking force may be applied by a bellows into which compressed air is admitted by the solenoid valve. Likewise, the solenoid valve may be operated by any suitable, conveniently available relay switch operated by the movement of a contact member in response to the movement of the plunger as herein provided.

It will be appreciated by those skilled in the art that the present invention can also be modified for use in determining the tensile strength of materials. For this purpose, the apparatus would be employed in essentially the same manner as disclosed herein. In this embodiment, however, the material to be tested can be secured to the bottom of a fixed support positioned above flange 20 of rod 19. Plunger 3 and receiving container 7 can be suspended from the material being tested by a line, or lines, attached to the material and to plunger 3 as, for example, at position 26. When the weight of the measuring fluid in container 7 is such that the total weight suspended from the material being tested exceeds its tensile strength, the material will break causing the plunger to drop, setting off the sequence of events hereinabove described.

The apparatus of the present invention, therefore, provides a relatively simple, inexpensive and quick means for accurately measuring the hardness or compression strength of crushable materials. The apparatus may readily be used to obtain meaningful and precise measurements of the comparative strength of crushable materials from different batches or operations. The equipment may easily be operated and is, furthermore, entirely independent of the skill and judgment of the operator.

While the invention has been described herein with reference to particular embodiments thereof, it will be appreciated by those skilled in the art that various changes and modifications can be made herein without departing from the scope of the invention as set forth in the appended claims.

Therefore, I claim:

1. An apparatus for determining the hardness of crushable materials comprising, in combination a supporting surface upon which a specimen of the crushable material is placed for test, a vertically movable plunger positioned above said specimen, and adapted to provide crushing pressure to said specimen, plunger pressure-increasing means attached to said plunger and adapted to continually increase the pressure of the plunger on said specimen, means for continually and uniformly increasing the weight of said plunger pressure-increasing means, and plunger-activated means for terminating said increase in weight, said means being activated to terminate the increase in weight of said plunger pressure-increasing means when the plunger drops to a lower specimen upon crushing said specimen, said plunger-activated means comprising switching means having an open and a closed position and communicating with electromechanical means for terminating said increase in weight, said means being activated to terminate said weight increase when said switch is in the open position, said switching means including a pivotable contact member adapted to assume a normally closed position when the plunger is in a raised position and including means attached thereto for pivoting said pivotable contact member to an open position until a hardness test is to be commenced, the sum of the weights of the plunger pressure-increasing means and the plunger upon crushing said specimen being a measure of the hardness of the crushable material.

2. An apparatus according to claim 1 in which said means for pivoting said pivotable contact member is adapted for movement between inoperative and operative positions, said means in the inoperative position holding the pivotable member in an open position, and in the operative position said means allowing said pivotable contact member to assume its normally closed position.

3. An apparatus according to claim 1 in which said plunger supports a rod that passes upwardly through an opening in said pivotable contact member, said rod having a flange at its upper end above said pivotable contact member, the downward force of the plunger upon crushing said test specimen causing said pivotable contact member to assume an open position, said plunger being upwardly movable for test without disturbing the normally closed position of the pivotable contact member.

4. An apparatus according to claim 3 in which the supporting surface is positioned above the flange, the test specimen is secured to both the flange and the supporting surface and the force exerted by the plunger at the point that it drops to a lower position is a measure of the tensile strength of the test specimen.